US010268331B2

(12) United States Patent
Li

(10) Patent No.: US 10,268,331 B2
(45) Date of Patent: Apr. 23, 2019

(54) INFORMATION PROCESSING METHOD AND ELECTRONIC DEVICE

(71) Applicant: Lenovo (Beijing) Co., Ltd., Haidan District, Beijing (CN)

(72) Inventor: Yuekui Li, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 235 days.

(21) Appl. No.: 14/757,597

(22) Filed: Dec. 23, 2015

(65) Prior Publication Data
US 2017/0060347 A1 Mar. 2, 2017

(30) Foreign Application Priority Data

Aug. 31, 2015 (CN) .......................... 2015 1 0549287

(51) Int. Cl.
*G06F 3/0481* (2013.01)
*G06T 11/00* (2006.01)
(Continued)

(52) U.S. Cl.
CPC ......... *G06F 3/0481* (2013.01); *G04G 9/0064* (2013.01); *G04G 21/00* (2013.01);
(Continued)

(58) Field of Classification Search
CPC . G06F 3/0481; G06F 3/04847; G04G 9/0064; G06T 11/001
See application file for complete search history.

(56) References Cited

U.S. PATENT DOCUMENTS 5,895,451 A * 4/1999 Yamade ............... G06Q 10/109
705/7.18
6,556,222 B1 * 4/2003 Narayanaswami .. G04G 9/0064
368/295
(Continued)

FOREIGN PATENT DOCUMENTS

CN 102821199 12/2012
CN 103237124 8/2013
(Continued)

OTHER PUBLICATIONS

First Office Action dated Oct. 17, 2017 (16 pages including English translation) from Chinese priority Application No. 201510549287.8.

(Continued)

*Primary Examiner* — Omar R Abdul-Ali
(74) *Attorney, Agent, or Firm* — Brinks Gilson & Lione; John C. Freeman

(57) ABSTRACT

An information processing method and an electronic device where the method includes determining current time information associated with the current time; and adjusting, based on the current time information, a display parameter of a first interactive object; wherein the first interactive object is an interactive object being operatively presented on a display unit of an electronic device and used to set a time-related parameter of the electronic device. The information processing method and the electronic device solve the technical problem that the currently displayed time cannot reflect the current true time in some cases, and achieve the technical effect of accurately and intuitively displaying the current true time.

17 Claims, 6 Drawing Sheets

(51) Int. Cl.
*G06F 3/0484* (2013.01)
*G04G 21/08* (2010.01)
*G04G 9/00* (2006.01)
*G04G 21/00* (2010.01)

(52) U.S. Cl.
CPC ......... *G04G 21/08* (2013.01); *G06F 3/04847* (2013.01); *G06T 11/001* (2013.01)

(56) References Cited

U.S. PATENT DOCUMENTS

| | | | |
|---|---|---|---|
| 6,662,366 B1* | 12/2003 | Hama | H04N 5/44 348/E5.096 |
| 8,416,261 B1* | 4/2013 | Lawson | G04G 9/0076 345/619 |
| 9,001,624 B2* | 4/2015 | Oh | G04G 13/021 368/10 |
| 9,613,270 B2* | 4/2017 | Sun | G01W 1/06 |
| 2006/0088165 A1 | 4/2006 | Yoon | |
| 2008/0165149 A1* | 7/2008 | Platzer | G04G 11/00 345/173 |
| 2013/0332721 A1* | 12/2013 | Chaudhri | G06F 9/4421 713/100 |
| 2014/0304664 A1* | 10/2014 | Lee | G06F 3/0488 715/863 |
| 2015/0199120 A1* | 7/2015 | Kim | G06T 11/60 715/799 |
| 2015/0235387 A1 | 8/2015 | Du | |

FOREIGN PATENT DOCUMENTS

| | | |
|---|---|---|
| CN | 103677562 | 3/2014 |
| CN | 104182188 A | 12/2014 |

OTHER PUBLICATIONS

Second Office Action dated Mar. 12, 2018 (19 pages including English translation) from Chinese priority Application No. 2015105492878.8.

* cited by examiner

INFORMATION PROCESSING METHOD AND ELECTRONIC DEVICE

This application claims priority to Chinese Patent Application No. 201510549287.8 filed on Aug. 31, 2015, the entire contents of which are incorporated herein by reference.

The present application relates to the field of electronic technique, and more particularly, to an information processing method and an electronic device.

BACKGROUND

With the continuous development of science and technology, electronic devices have also made rapid progress and become people's daily life necessities. To avoid forgetting an important event, users usually set an alarm clock in electronic devices, so as to realize the function of alerting the users.

In the prior art, when the users need to set an alarm clock, they first need to open an alarm clock application, and then they perform a dialing operation on a time dial of the alarm clock to select a user-desired time, for example, dialing the time dial to make time currently being displayed by the time dial be "12:00 am", and last, they just enter an alert event into a corresponding event input box.

However, in the process of implementing the technical solutions in embodiments of the present application, the inventor of the present application finds that the prior art has the following technical problem:

In the prior art, when an electronic device adopts a 12-hour system to display time, time "12:00 am" on the time dial may represent either "12:00 at noon", or "12:00 before dawn", so in the process of setting an alarm clock, it is hard for the users to tell the currently displayed "12:00 am" specifically is "12:00 at noon" or "12:00 before dawn", therefore, the electronic devices in the prior art have the technical problem that the currently displayed time cannot reflect the current true time in some cases.

SUMMARY

An aspect of the present application provides an information processing method, comprising:

determining current time information associated with current; and adjusting, based on the current time information, a display parameter of a first interactive object;

wherein the first interactive object specifically is an interactive object being operatively presented on a display unit of an electronic device and used to set a time-related parameter of the electronic device.

Optionally, the display parameter specifically is a color parameter or an image parameter or a text parameter.

Optionally, when the display parameter specifically is the color parameter, adjusting, based on the current time information, a display parameter of a first interactive object specifically comprises:

determining a first time period corresponding to the current time information; and generating, based on the first time period and a first correspondence between time period and color, a first color parameter value corresponding to the current time information.

Optionally, when the display parameter specifically is the color parameter, adjusting, based on the current time information, a display parameter of a first interactive object specifically comprises:

determining a first preset time which is closest to the current time among a plurality of preset time prior to the current time, and determining a second preset time which is closest to the current time among a plurality of preset time later than the current time;

obtaining a first time interval between the current time and the first preset time, and a second time interval between the current time and the second preset time;

determining, based on a second correspondence between time period and color, a third color parameter value corresponding to the first time interval and a fourth color parameter value corresponding to the second time interval; and generating, based on the third color parameter value and the fourth color parameter value, a second color parameter value corresponding to the current time information.

Optionally, when the display parameter specifically is the image parameter, adjusting, based on the current time information, a display parameter of a first interactive object specifically comprises:

determining a second time period corresponding to the current time information; and generating, based on the second time period and a second correspondence between time period and image, a first image parameter value corresponding to the current time information.

Optionally, when the display parameter specifically is the text parameter, adjusting, based on the current time information, a display parameter of a first interactive object specifically comprises:

determining a third time period corresponding to the current time information;

generating, based on the third time period and a third correspondence between time period and text, a first text parameter value corresponding to the current time information.

Optionally, the first interactive object specifically is a time dial or a time setting display interface.

An embodiment of the present application further provides an electronic device, comprising:

a housing;

a display screen having a display area that is exposed via a first window of the housing;

a processor configured to determine current time information associated with current time, and adjust, based on the current time information, a display parameter of a first interactive object, wherein the first interactive object specifically is an interactive object being operatively presented on the display screen of the electronic device and used to set a time-related parameter of the electronic device.

Optionally, when the display parameter specifically is a color parameter, the processor is configured to:

determine a first time period corresponding to the current time information; and generate, based on the first time period and a first correspondence between time period and color, a first color parameter value corresponding to the current time information.

Optionally, when the display parameter specifically is a color parameter, the processor is configured to:

determine a first preset time which is closest to the current time among a plurality of preset time prior to the current time, and determine a second preset time which is closest to the current time among a plurality of preset time later than the current time;

obtain a first time interval between the current time and the first preset time, and a second time interval between the current time and the second preset time;

determine, based on a second correspondence between time period and color, a third color parameter value corresponding to the first time interval and a fourth color parameter value corresponding to the second time interval; and generate, based on the third color parameter value and the fourth color parameter value, a second color parameter value corresponding to the current time information.

Optionally, when the display parameter specifically is an image parameter, the processor is configured to:

determine a second time period corresponding to the current time information; and generate, based on the second time period and a second correspondence between time period and image, a first image parameter value corresponding to the current time information.

Optionally, when the display parameter specifically is a text parameter, the processor is configured to:

determine a third time period corresponding to the current time information;

generate, based on the third time period and a third correspondence between time period and text, a first text parameter value corresponding to the current time information.

BRIEF DESCRIPTION OF THE DRAWINGS

In order to more clearly explain the technical solutions in the embodiments of the present application or in the prior art, drawings necessary for descriptions of the embodiments thereof will be introduced briefly, obviously, the drawings described below are merely parts of embodiments of the present application.

DETAILED DESCRIPTION

The present application provides an information processing method and an electronic device, for solving the technical problem that the currently displayed time cannot reflect the current true time in some cases, and achieving the technical effect of accurately and intuitively displaying the current true time.

To solve the above technical problem, the technical solutions in the embodiments of the present application have a general concept as follows:

determining current time information associated with current time; and adjusting, based on the current time information, a display parameter of a first interactive object;

wherein the first interactive object specifically is an interactive object being operatively presented on a display unit of an electronic device and used to set a time-related parameter of the electronic device.

In the above technical solutions, the following technical means are adopted: determining current time information associated with current time; and adjusting, based on the current time information, a display parameter of a first interactive object, wherein the first interactive object specifically is an interactive object being operatively presented on a display unit of an electronic device and used to set a time-related parameter of the electronic device. As such, when the users perform a time setting via the first interactive object, the users can judge a true time to which the displayed time corresponds based on a conjunction of the time displayed by the first interactive object and the display parameter of the first interactive object, for example, the displayed time is in conjunction with a background color, or the displayed time is in conjunction with a picture of the first interactive object, and so on, thereby the true time currently displayed by the first interactive object is accurately and intuitively reflected.

To better understand the above technical solutions, hereinafter, the above technical solutions will be described in detail in conjunction with the drawings and the specific implementations of the specification. It should be understood that embodiments of the present application and specific features thereof are detailed descriptions of the technical solutions of the present application, rather than limitations to the technical solutions of the present application, in the case of no conflict, the embodiments of the present application and specific features thereof may be mutually combined.

First Embodiment

Figure 1:
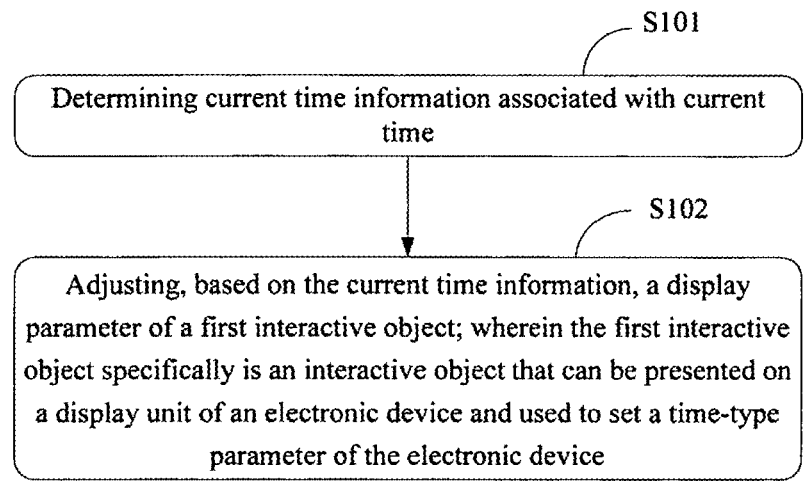
FIG. 1 is a flowchart of an information processing method provided in a first embodiment of present application.

Referring to FIG. 1, FIG. 1 illustrates an information processing method provided in a first embodiment of present application, the method comprising:

S101: determining current time information associated with current time;

S102: adjusting, based on the current time information, a display parameter of a first interactive object;

wherein the first interactive object specifically is an interactive object being operatively presented on a display unit of an electronic device and used to set a time-related parameter of the electronic device.

In the embodiment of the present application, the electronic device may specifically be a smart phone, a tablet computer, a notebook computer, or other electronic devices that have a display unit and need to set a time-related parameter via the first interactive object, illustration will not be made one by one here; the display unit may be a display screen with a touch function, or a display screen that is only used to display content without having a touch function; the time-related parameter may be clock time of the electronic device, may also be alarm clock time of the electronic device, the embodiment of the present application makes no limitations thereto.

Figure 2:
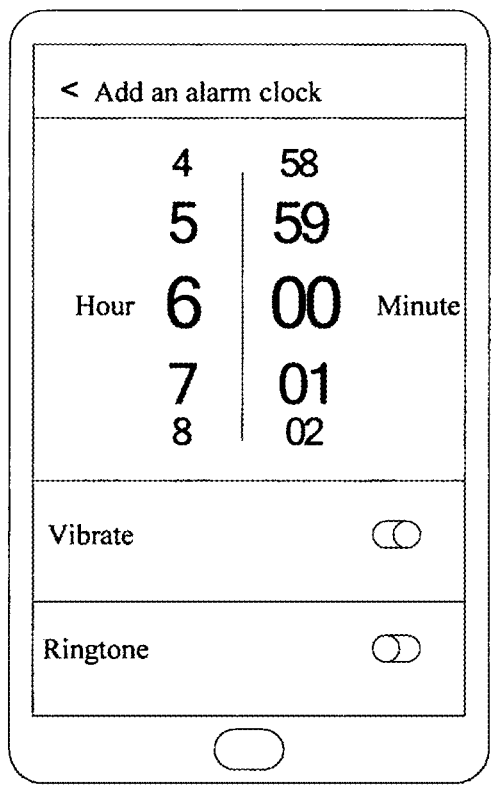
FIG. 2 is a first schematic diagram of the first interactive object provided in the first embodiment of the present application.
Figure 3:
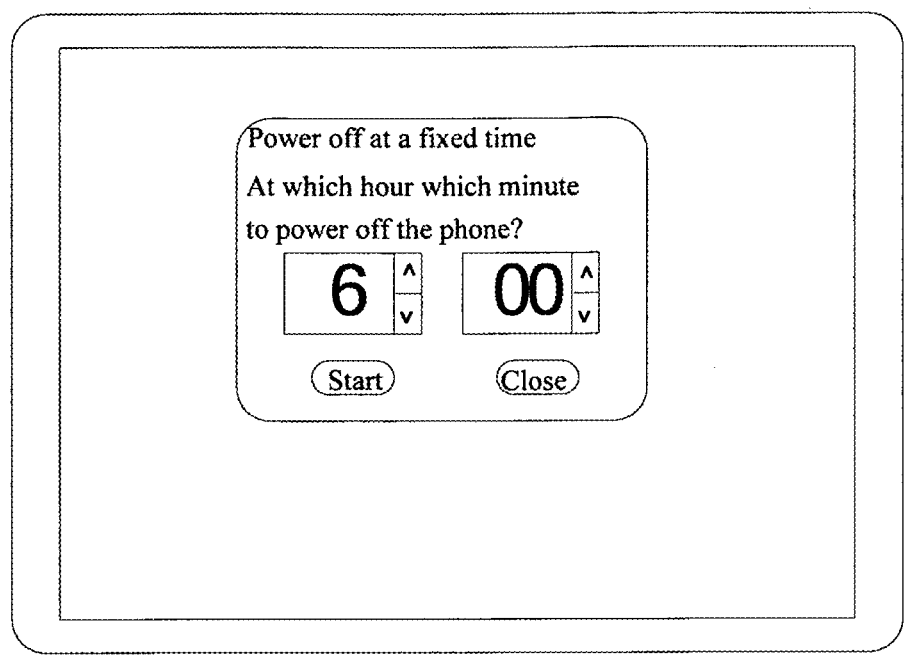
FIG. 3 is a second schematic diagram of the first interactive object provided in the first embodiment of the present application.

In the embodiment of the present application, the first interactive object may specifically be a time dial or a time setting display interface. In specific implementing process, the time dial may be a time dial for setting time of a tablet computer, or a time dial for setting time of an alarm clock of a smart phone, as shown in FIG. 2; the time setting display interface may be a display interface of desktop time of a notebook computer, or a time display interface for setting a fixed time to power off the notebook computer, as shown in FIG. 3. In the embodiment of the present application, take setting an alarm clock of a smart phone via a time dial of the alarm clock as example, implementing process of the method in the embodiment of the present application will be described in detail.

When executing the information processing method in the embodiment of the present application, first step S101 is executed, i.e., determining current time information associated with current time.

In specific implementing process, take setting an alarm clock of a smart phone via a time dial of the alarm clock as example, the alarm clock shows time based on a 12-hour system, when the users open an alarm clock application in a smart phone to set an alarm time, the smart phone will pop a time dial of the alarm clock, on which the current time will be displayed, for example, the current time is "6:00 am", then the currently displayed time on the time dial of the alarm clock is "6:00", as shown in FIG. 2.

After step S101 is executed, the method in the embodiment of the present application proceeds to step S102, i.e., adjusting, based on the current time information, a display parameter of a first interactive object.

In the first embodiment of the present application, the display parameter specifically is a color parameter or an image parameter or a text parameter. Specific implementing manners of step S102 are different due to different specific display parameters, there are three manners in particular.

First Manner:

When the display parameter specifically is the color parameter, there are two specific cases in particular provided below.

Figure 4:
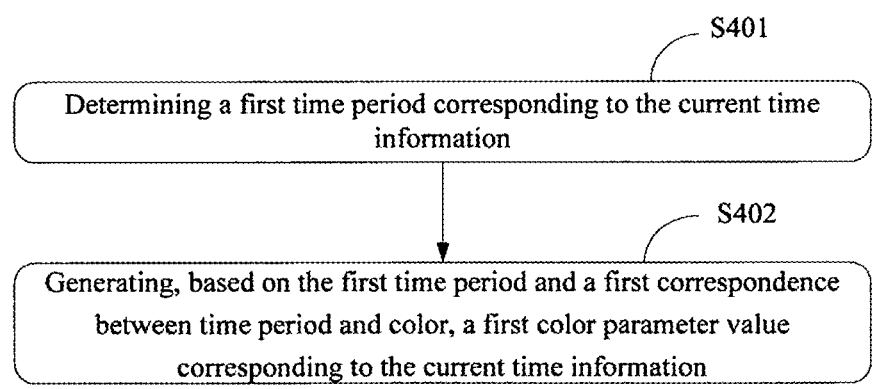
FIG. 4 is a flowchart of a specific implementation in case A of a first specific implementation manner of step S102 in the first embodiment of the present application.

Case A, referring to FIG. 4.

A specific implementing manner of step S102 is:

S401: determining a first time period corresponding to the current time information; and S402: generating, based on the first time period and a first correspondence between time period and color, a first color parameter value corresponding to the current time information.

Figure 5:
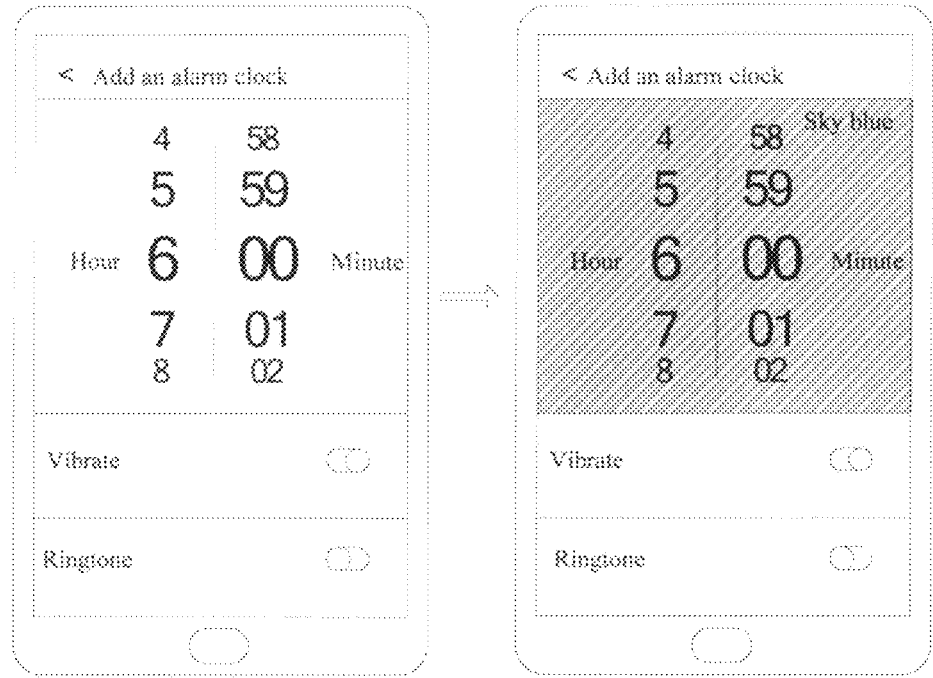
FIG. 5 is a schematic diagram of a specific implementation in case A of a first specific implementation manner of step S102 in the first embodiment of the present application.

In specific implementing process, the example provided above is still adopted, after the alarm clock application determines that the currently displayed time is "6:00 am", the alarm clock needs to determine a time period corresponding to "6:00", multiple time periods may be set in advance in the alarm clock application, for example, "0:01" to "6:00" before dawn is set as a dawn time period, "6:01" to "12:00" in the morning is set as a forenoon time period, "12:01" to "6:00" after the noon is set as an afternoon time period, "6:01" to "12:00" at night is set as a night time period, thereby 24 hours are divided into 4 time periods; meanwhile, the alarm clock can automatically set a color corresponding to each time period, for example, the dawn time period corresponds to a sky blue, the forenoon time period corresponds to orange, the afternoon time period corresponds to red, and the night time period corresponds to dark blue, of course, this may also be set by the users via the alarm clock application, the present application makes no limitations thereto. The alarm clock determines the currently displayed "6:00" is in the dawn time period based on the multiple time periods set in advance, then the alarm clock will adjust a background color of the time dial of the alarm clock as sky blue corresponding to the dawn time period, as shown in FIG. 5.

Figure 6:
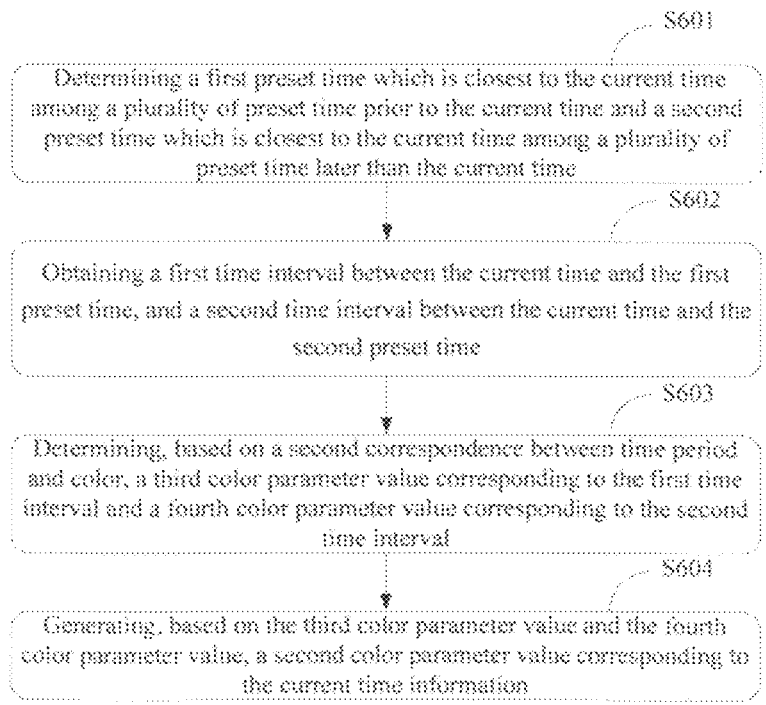
FIG. 6 is a flowchart of a specific implementation in case B of a first specific implementation manner of step S102 in the first embodiment of the present application.

Case B, referring to FIG. 6.

A specific implementing manner of step S102 is:

S601: determining a first preset time which is closest to the current time among a plurality of preset time prior to the current time, and determining a second preset time which is closest to the current time among a plurality of preset time later than the current time;

S602: obtaining a first time interval between the current time and the first preset time, and a second time interval between the current time and the second preset time;

S603: determining, based on a second correspondence between time period and color, a third color parameter value corresponding to the first time interval and a fourth color parameter value corresponding to the second time interval; and S604: generating, based on the third color parameter value and the fourth color parameter value, a second color parameter value corresponding to the current time information.

In specific implementing process, the example provided above is still adopted, in the alarm clock application, colors corresponding to several time periods may be set in advance, for example, three time points may be set in advance, which respectively are "8:00 am", "4:00 pm", "12:00 at night"; and "8:00 am" corresponds to red, its RGB value is (255, 0, 0), "4:00 pm" corresponds to yellow, its RGB value is (255, 255, 0), and "12:00 at night" corresponds to blue, its RGB value is (0, 0, 255).When the alarm clock application determines that the currently displayed time is "6:00 am", it determines that "6:00 am" is between "12:00 at night" and "8:00 am", and determines that a time interval between "6:00 am" and "12:00 at night" is 6 hours, a time interval between "6:00 am" and "8:00 am" is 2 hours, then a color to which "6:00 am" corresponds is blended by two colors of red and blue, a value taken for blue is 255−255*6/8=63.75; a value taken for red is 255*6/8=191.25, accordingly, a RGB value corresponding to "6:00 am" is (191.25, 0, 63.75).

Figure 7:
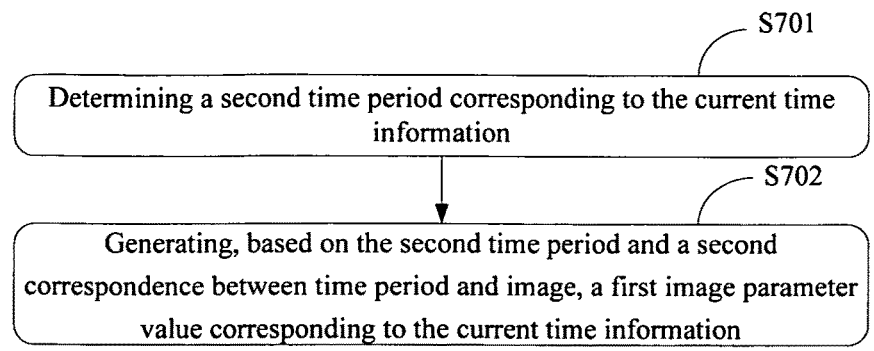
FIG. 7 is a flowchart of a specific implementation of a second specific implementation manner of step S102 in the first embodiment of the present application.

Second Manner:

When the display parameter specifically is the image parameter, referring to FIG. 7, a specific implementing process of step S102 is as follows:

S701: determining a second time period corresponding to the current time information; and S702: generating, based on the second time period and a second correspondence between time period and image, a first image parameter value corresponding to the current time information.

Figure 8:
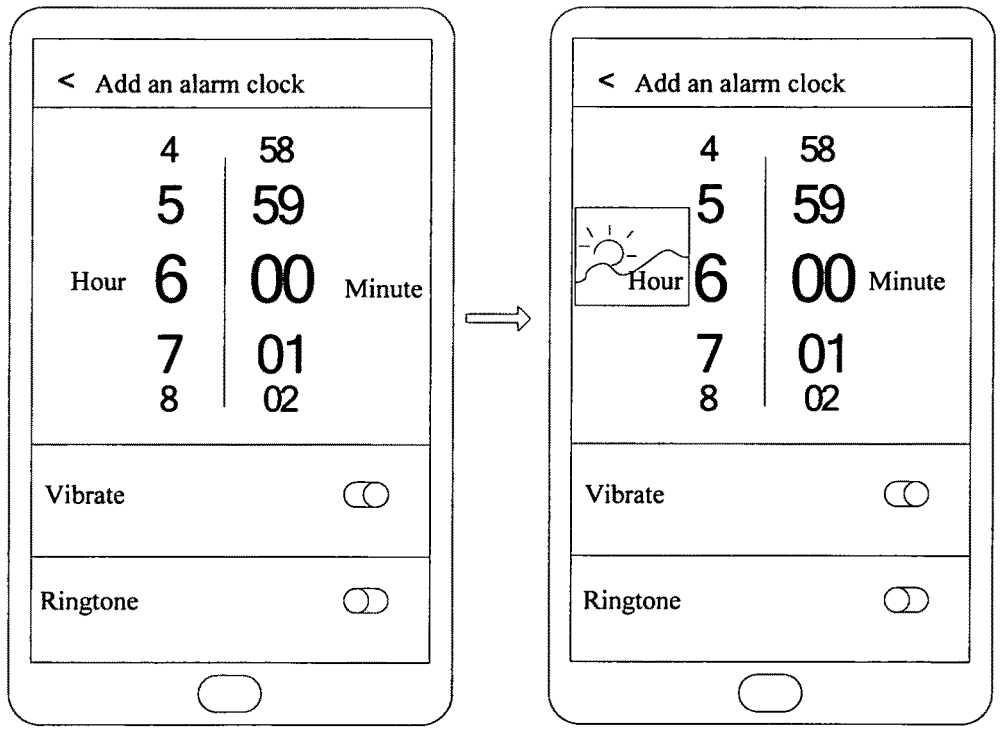
FIG. 8 is a schematic diagram of a specific implementation of a second specific implementation manner of step S102 in the first embodiment of the present application.

In specific implementing process, the example provided above is still adopted, after the alarm clock application determines that the currently displayed time is "6:00 am", the alarm clock needs to determine a time period corresponding to "6:00", multiple time periods may be set in advance in the alarm clock application, for example, "0:01"

to "6:00" before dawn is set as a dawn time period, "6:01" to "12:00" in the morning is set as a forenoon time period, "12:01" to "6:00" after the noon is set as an afternoon time period, "6:01" to "12:00" at night is set as a night time period, thereby 24 hours are divided into 4 time periods; meanwhile, the alarm clock can automatically set an image corresponding to each time period, for example, the dawn time period corresponds to an image of sunrise, the forenoon time period corresponds to an image of burning sun in sky, the afternoon time period corresponds to an image of sunset, and the night time period corresponds to an image of stars in sky, of course, this may also be set by the users via the alarm clock application, the present application makes no limitations thereto. The alarm clock determines the currently displayed "6:00" is in the dawn time period based on the multiple time periods set in advance, then the alarm clock will display an image of sunrise corresponding to the dawn time period at a first position of the time dial of the alarm clock, as shown in FIG. 8.

Figure 9:
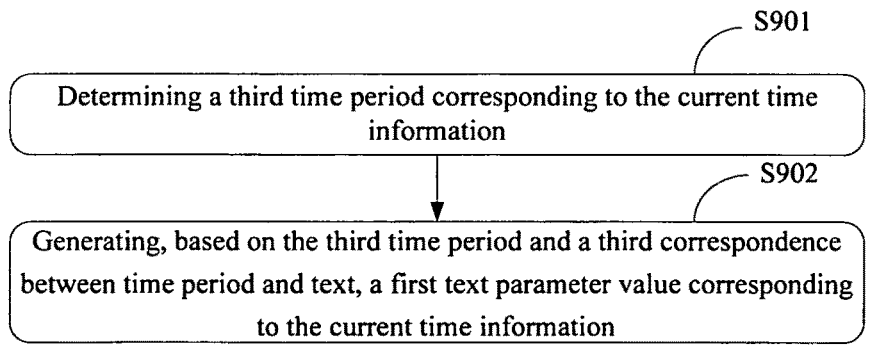
FIG. 9 is a flowchart of a specific implementation of a third specific implementation manner of step S102 in the first embodiment of the present application.

Third Manner:

When the display parameter specifically is the text parameter, referring to FIG. 9, a specific implementing process of step S102 is as follows:

S901: determining a third time period corresponding to the current time information; and S902: generating, based on the third time period and a third correspondence between time period and text, a first text parameter value corresponding to the current time information.

Figure 10:
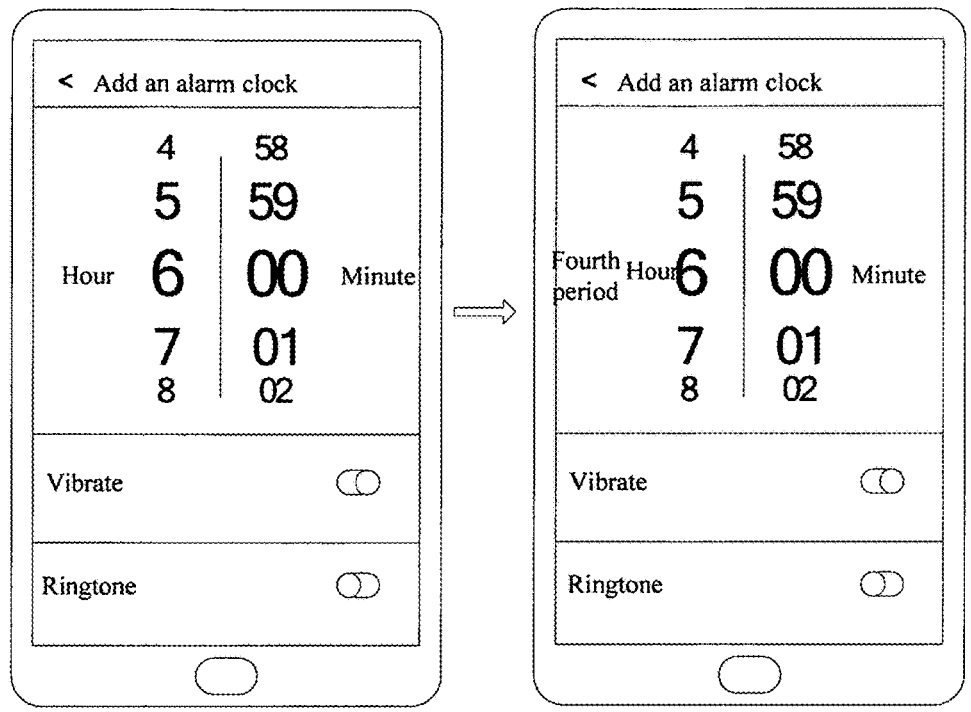
FIG. 10 is a schematic diagram of a specific implementation of a third specific implementation manner of step S102 in the first embodiment of the present application.

In specific implementing process, the example provided above is still adopted, after the alarm clock application determines that the currently displayed time is "6:00 am", the alarm clock needs to determine a time period corresponding to "6:00", multiple time periods may be set in advance in the alarm clock application, for example, "23:00" to "1:00" at night may be set as a time period named "first period", "1:00" to "3:00" before dawn is set as a time period named "second period", "3:00" to "5:00" at dawn is set as a time period named "third period", "5:00" to "7:00" in the morning is set as a time period named "fourth period", and so on, and so forth, thereby 24 hours are divided into 12 time periods; of course, this may also be set by the users via the alarm clock application, the present application makes no limitations thereto. The alarm clock determines the currently displayed "6:00" is in the time period named "fourth period", then the alarm clock will display the text "fourth period" at a first position of the time dial of the alarm clock, as shown in FIG. 10.

With the above technical solutions, the users can clearly distinguish between "12:00" at night and "12:00" at noon, the technical effect of accurately and intuitively displaying the current true time is achieved.

Second Embodiment

Figure 11:
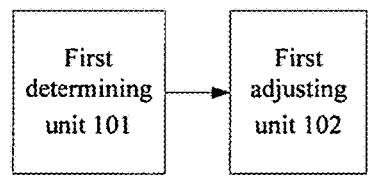
FIG. 11 is a structural block diagram of an electronic device provided in a second embodiment of the present application.

Based on the same technique concept, a second embodiment of the present application provides an electronic device, referring to FIG. 11, the electronic device comprising:

a first determining unit 101 for determining current time information associated with current time; and a first adjusting unit 102 for adjusting, based on the current time information, a display parameter of a first interactive object;

wherein the first interactive object specifically is an interactive object being operatively presented on a display unit of the electronic device and used to set a time-related parameter of the electronic device.

In the second embodiment of the present application, the first adjusting unit 102 specifically has four specific implementing manners provided as below.

First Manner:

When the display parameter specifically is a color parameter, the first adjusting unit 102 specifically comprises:

a first determining module for determining a first time period corresponding to the current time information; and a first generating module for generating, based on the first time period and a first correspondence between time period and color, a first color parameter value corresponding to the current time information.

Second Manner:

When the display parameter specifically is a color parameter, the first adjusting unit 102 specifically comprises:

a second determining module for determining a first preset time which is closest to the current time among a plurality of preset time prior to the current time, and determining a second preset time which is closest to the current time among a plurality of preset time later than the current time;

a first obtaining module for obtaining a first time interval between the current time and the first preset time, and a second time interval between the current time and the second preset time;

a third determining module for determining, based on a second correspondence between time period and color, a third color parameter value corresponding to the first time interval and a fourth color parameter value corresponding to the second time interval; and a second generating module for generating, based on the third color parameter value and the fourth color parameter value, a second color parameter value corresponding to the current time information.

Third Manner:

When the display parameter specifically is an image parameter, the first adjusting unit 102 specifically comprises:

a fourth determining module for determining a second time period corresponding to the current time information; and a third generating module for generating, based on the second time period and a second correspondence between time period and image, a first image parameter value corresponding to the current time information.

Fourth Manner:

When the display parameter specifically is a text parameter, the first adjusting unit 102 specifically comprises:

a fifth determining module for determining a third time period corresponding to the current time information;

a fourth generating module for generating, based on the third time period and a third correspondence between time period and text, a first text parameter value corresponding to the current time information.

Third Embodiment

Figure 12:
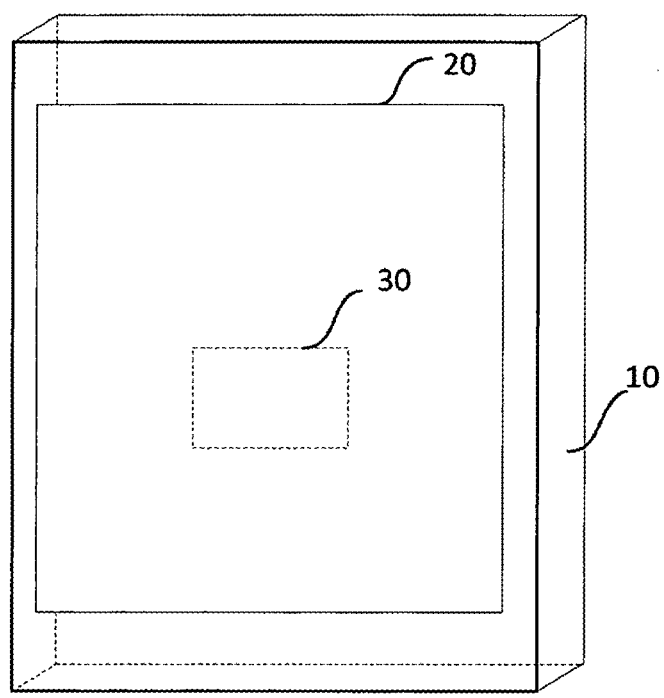
FIG. 12 is a structural block diagram of an electronic device provided in a third embodiment of the present application.

Based on the same technique concept, a third embodiment of the present application provides an electronic device, referring to FIG. 12, the electronic device comprising:

a housing 10;

a display screen 20 having a display area that is exposed via a first window of the housing 10;

a processor 30 configured to determine current time information, and adjust, based on the current time information, a display parameter of a first interactive object, wherein the first interactive object specifically is an interactive object being operatively presented on the display screen 20 of the electronic device and used to set a time-related parameter of the electronic device.

In the third embodiment of the present application, when the display parameter specifically is a color parameter, the processor 30 is configured to:

determine a first time period corresponding to the current time information associated with current time; and generate, based on the first time period and a first correspondence between time period and color, a first color parameter value corresponding to the current time information.

In the third embodiment of the present application, when the display parameter specifically is a color parameter, the processor 30 is configured to determine a first preset time which is closest to the current time among a plurality of preset time prior to the current time and a second preset time which is closest to the current time among a plurality of preset time later than the current time;

obtain a first time interval between the current time and the first preset time, and a second time interval between the current time and the second preset time;

determine, based on a second correspondence between time period and color, a third color parameter value corresponding to the first time interval and a fourth color parameter value corresponding to the second time interval; and generating, based on the third color parameter value and the fourth color parameter value, a second color parameter value corresponding to the current time information.

In the third embodiment of the present application, when the display parameter specifically is an image parameter, the processor 30 is configured to:

determine a second time period corresponding to the current time information; and generate, based on the second time period and a second correspondence between time period and image, a first image parameter value corresponding to the current time information. In the third embodiment of the present application.

In the third embodiment of the present application, when the display parameter specifically is a text parameter, the processor 30 is configured to:

determine a third time period corresponding to the current time information;

generate, based on the third time period and a third correspondence between time period and text, a first text parameter value corresponding to the current time information.

One or more technical solutions provided in the embodiments of the present application have the following one or more technical effects or advantages:

1. The technical solutions in the embodiments of the present application adopt the technical means of: determining current time information associated with current time; and adjusting, based on the current time information, a display parameter of a first interactive object, wherein the first interactive object specifically is an interactive object being operatively presented on a display unit of an electronic device and used to set a time-related parameter of the electronic device. As such, when the users perform a time setting via the first interactive object, the users can judge a true time to which the displayed time corresponds based on a conjunction of the time displayed by the first interactive object and the display parameter of the first interactive object, for example, the displayed time is in conjunction with a background color, or the displayed time is in conjunction with a picture of the first interactive object, and so on, thereby the true time currently displayed by the first interactive object is accurately and intuitively reflected.

2. The technical solutions in the embodiments of the present application adopt the technical means of: determining current time information associated with current time; and adjusting, based on the current time information, a display parameter of a first interactive object, wherein the first interactive object specifically is an interactive object being operatively presented on a display unit of an electronic device and used to set a time-related parameter of the electronic device. As such, when the users perform a time setting via the first interactive object, the users can judge a true time to which the displayed time corresponds based on a conjunction of the time displayed by the first interactive object and the display parameter of the first interactive object, for example, the displayed time is in conjunction with a background color, or the displayed time is in conjunction with a picture of the first interactive object, and so on, thereby the true time currently displayed by the first interactive object is accurately and intuitively reflected, and further, when the users use the first interactive object to adjust time, errors would not occur, the technical effect of avoiding mistakenly setting a time is achieved.

3. The technical solutions in the embodiments of the present application adopt the technical means of: determining a first preset time which is closest to the current time among a plurality of preset time prior to the current time and a second preset time which is closest to the current time among a plurality of preset time later than the current time; obtaining a first time interval between the current time and the first preset time, and a second time interval between the current time and the second preset time; determining, based on a second correspondence between time period and color, a third color parameter value corresponding to the first time interval and a fourth color parameter value corresponding to the second time interval; and generating, based on the third color parameter value and the fourth color parameter value, a second color parameter value corresponding to the current time information. As such, the electronic device can determine a color corresponding to each time by determining an interval between the currently displayed time and two preset time, so that color of the first interactive object can vary along with change of the displayed time to show a gradual change effect, for example, when the users change the displayed time of the first interactive object from "6:00 am" to "6:00 pm", the background color of the first interactive object can change from golden yellow to dark blue, the technical effect of enhancing user experience is achieved.

Those skilled in the art should understand that, the embodiments of the present application can be provided as a method, a system or a computer program product. Therefore, the present application can adopt forms of a full hardware embodiment, a full software embodiment, or an embodiment combining software and hardware aspects. And, the present application can adopt forms of a computer program product implemented on one or more computer usable storage mediums (including, but not limited to, magnetic disk storage, CD-ROM, optical memory, or the like) including computer usable program codes.

The present application is described by referring to flow charts and/or block diagrams of method, apparatus (system) and computer program product according to the embodiments of the present application. It should be understood that each flow and/or block in the flow charts and/or block diagrams and the combination of the flow and/or block in the flow charts and/or block diagrams can be implemented by computer program instructions. These computer program instructions can be provided to processors of a general purpose computer, a dedicated computer, an embedded processor or other programmable data processing apparatus to generate a machine, so that a device for implementing functions specified in one or more flows of the flow charts and/or one or more blocks of the block diagrams is generated by the instructions executed by the processors of the computer or other programmable data processing apparatus.

These computer program instructions can also be stored in computer readable storage which is able to direct the computer or other programmable data processing apparatus to operate in specific manners, so that the instructions stored in the computer readable storage generate manufactured articles including commander equipment, which implements functions specified by one or more flows in the flow charts and/or one or more blocks in the block diagrams.

These computer program instructions can be loaded to computer or other programmable data processing apparatus, so that a series of operation steps are executed on the computer or other programmable apparatus to generate computer implemented process, so that the instructions executed on the computer or other programmable apparatus provide steps for implementing functions specified in one or more flows of the flow charts and/or one or more blocks of the block diagrams.

In particular, the computer program instructions to which the information processing method in the embodiments of the present application correspond can be stored in an optical disk, a hard disk, a U disk, and other storage medium, when the computer program instructions corresponding to the information processing method as stored in the storage medium are read or executed by an electronic device, the following steps are comprised:

determining current time information associated with current time; and adjusting, based on the current time information, a display parameter of a first interactive object;

wherein the first interactive object specifically is an interactive object being operatively presented on a display unit of an electronic device and used to set a time-related parameter of the electronic device.

Optionally, in the process that the computer instruction corresponding to the step of when the display parameter specifically is a color parameter, adjusting, based on the current time information, a display parameter of a first interactive object as stored in the storage medium is executed, the following step is comprised in particular:

determining a first time period corresponding to the current time information; and generating, based on the first time period and a first correspondence between time period and color, a first color parameter value corresponding to the current time information.

Optionally, in the process that the computer instruction corresponding to the step of when the display parameter specifically is a color parameter, adjusting, based on the current time information, a display parameter of a first interactive object as stored in the storage medium is executed, the following step is comprised in particular:

determining a first preset time which is closest to the current time among a plurality of preset time prior to the current time and a second preset time which is closest to the current time among a plurality of preset time later than the current time;

obtaining a first time interval between the current time and the first preset time, and a second time interval between the current time and the second preset time;

determining, based on a second correspondence between time period and color, a third color parameter value corresponding to the first time interval and a fourth color parameter value corresponding to the second time interval; and generating, based on the third color parameter value and the fourth color parameter value, a second color parameter value corresponding to the current time information.

Optionally, in the process that the computer instruction corresponding to the step of when the display parameter specifically is an image parameter, adjusting, based on the current time information, a display parameter of a first interactive object as stored in the storage medium is executed, the following step is comprised in particular:

determining a second time period corresponding to the current time information; and generating, based on the second time period and a second correspondence between time period and image, a first image parameter value corresponding to the current time information.

Optionally, in the process that the computer instruction corresponding to the step of when the display parameter specifically is a text parameter, adjusting, based on the current time information, a display parameter of a first interactive object as stored in the storage medium is executed, the following step is comprised in particular:

determining a third time period corresponding to the current time information;

generating, based on the third time period and a third correspondence between time period and text, a first text parameter value corresponding to the current time information.

Although preferred embodiments of the present application have been described, those skilled in the art can make additional changes and modifications to these embodiments once learning the basic inventive concepts thereof. Therefore, the appended claims are intended to be interpreted as including the preferred embodiments as well as all changes and modifications that fall into the scope of the present application.

Obviously, those skilled in the art can make various modifications and variations to the present application without departing from the spirit and scope thereof. Thus, if these modifications and variations of the present application are within the scope of the claims of the application as well as their equivalents, the present application is also intended to include these modifications and variations.

The invention claimed is:

1. An information processing method, applicable to an electronic device, the method comprising:

determining current time information associated with current time of an electronic device; and adjusting, based on the current time information, a display parameter of an interactive object;

wherein the interactive object is an interactive object being operatively presented on a display unit of the electronic device and used to set a time-related parameter of the electronic device, and wherein the display parameter is a color parameter, an image parameter, or a text parameter, and wherein the display parameter is differently adjusted based on the current time information of the electronic device being in different time periods of one day, and the interactive object presented on the display unit of the electronic device displays the current time information and visually presents, on the display unit, the display parameter that is adjusted; and wherein when the display parameter is the color parameter, the adjusting, based on the current time information, a display parameter of the interactive object comprises:
  determining a preset time, which is closest to the current time;
  obtaining a time interval between the current time and the preset time; and
  determining a color parameter value of the color parameter based on the time interval.

2. The information processing method according to claim 1, wherein when the display parameter is the color parameter, the adjusting, based on the current time information, the display parameter of the first interactive object comprises:
  generating, based on the time interval and a correspondence between time period and color, the color parameter value corresponding to the current time information.

3. The information processing method according to claim 1, wherein when the display parameter is the color parameter, the adjusting, based on the current time information, a display parameter of the interactive object comprises:
  determining a second preset time which is closest to the current time among a plurality of preset times later than the current time;
  obtaining a second time interval between the current time and the second preset time;
  determining, based on a correspondence between time period and color, a third color parameter value corresponding to the first time interval and a fourth color parameter value corresponding to the second time interval; and
  generating, based on the third color parameter value and the fourth color parameter value, a second color parameter value corresponding to the current time information.

4. The information processing method according to claim 1, wherein when the display parameter is the image parameter, the adjusting, based on the current time information, a display parameter of the interactive object comprises:
  determining a time period corresponding to the current time information; and
  generating, based on the time period and a correspondence between time period and image, an image parameter value corresponding to the current time information.

5. The information processing method according to claim 1, wherein when the display parameter is the text parameter, the adjusting, based on the current time information, a display parameter of the interactive object comprises:
  determining a time period corresponding to the current time information;
  generating, based on the time period and a correspondence between time period and text, a text parameter value corresponding to the current time information.

6. The information processing method according to claim 1, wherein the interactive object is a time dial or a time setting display interface.

7. An electronic device comprising:
  a housing;
  a display screen having a display area that is exposed via a window of the housing;
  a processor configured to:
    determine current time information associated with current time of the electronic device, and
    adjust, based on the current time information, a display parameter of an interactive object, wherein the interactive object is operatively presented on the display screen of the electronic device and used to set a time-related parameter of the electronic device, and
  wherein the display parameter is a color parameter, an image parameter, or a text parameter, and wherein the display parameter is differently adjusted based on the current time information of the electronic device being in different time periods of one day, and the interactive object presented on the display screen of the electronic device displays the current time information and visually presents, on the display screen, the display parameter that is adjusted; and
  wherein when the display parameter is the color parameter, the processor is configured to:
    determine a preset time, which is closest to the current time;
    obtain a time interval between the current time and the preset time; and
    determine a color parameter value of the color parameter based on the time interval.

8. The electronic device according to claim 7, wherein when the display parameter is the color parameter, the processor is configured to:
  generate, based on the time interval and a correspondence between time period and color, the color parameter value corresponding to the current time information.

9. The electronic device according to claim 7, wherein when the display parameter is the color parameter, the processor is configured to:
  determine a second preset time which is closest to the current time among a plurality of preset times later than the current time;
  obtain a second time interval between the current time and the second preset time;
  determine, based on a correspondence between time period and color, a third color parameter value corresponding to the first time interval and a fourth color parameter value corresponding to the second time interval; and
  generate, based on the third color parameter value and the fourth color parameter value, a second color parameter value corresponding to the current time information.

10. The electronic device according to claim 7, wherein when the display parameter is the image parameter, the processor is configured to:
  determine a time period corresponding to the current time information; and
  generate, based on the time period and a correspondence between time period and image, an image parameter value corresponding to the current time information.

11. The electronic device according to claim 7, wherein when the display parameter is the text parameter, the processor is configured to:
  determine a time period corresponding to the current time information;
  generate, based on the time period and a correspondence between time period and text, a text parameter value corresponding to the current time information.

12. An electronic device comprising;
  a housing;
  a display screen having a display area that is exposed via a first window of the housing;
  a processor; and
  a storage medium that stores instructions executable by the processor to perform the following processes:
    determining current time information associated with current time; and adjusting, based on the current time information, a display parameter of an interactive object;

wherein the interactive object is operatively presented on a display unit of an electronic device and used to set a time-related parameter of the electronic device, and the display parameter is a color parameter, an image parameter, or a text parameter, and wherein the display parameter is differently adjusted based on the current time information of the electronic device being in different time periods of one day, and the interactive object presented on the display unit of the electronic device displays the current time information and visually presents, on the display unit, the display parameter that is adjusted; and wherein when the display parameter is the color parameter, the storage medium further stores instructions executable by the processor to perform the following processes:

determine a preset time, which is closest to the current time;

obtain a time interval between the current time and the preset time; and determine a color parameter value of the color parameter based on the time interval.

13. The electronic device as claimed in claim 12, wherein when the display parameter is the color parameter, the storage medium further stores instructions executable by the processor to perform the process of:

generating, based on the time interval and a correspondence between time period and color, the color parameter value corresponding to the current time information.

14. The electronic device according to claim 12, wherein when the display parameter is the color parameter, the storage medium further stores instructions executable by the processor to perform the processes of:

determining a second preset time which is closest to the current time among a plurality of preset times later than the current time;

obtaining a second time interval between the current time and the second preset time;

determining, based on a correspondence between time period and color, a third color parameter value corresponding to the first time interval and a fourth color parameter value corresponding to the second time interval; and generating, based on the third color parameter value and the fourth color parameter value, a second color parameter value corresponding to the current time information.

15. The electronic device according to claim 12, wherein when the display parameter is the image parameter, the storage medium further stores instructions executable by the processor to perform the processes of:

determining a time period corresponding to the current time information; and generating, based on the time period and a correspondence between time period and image, an image parameter value corresponding to the current time information.

16. The electronic device according to claim 12, wherein when the display parameter is the text parameter, the storage medium further stores instructions executable by the processor to perform the processes of:

determining a time period corresponding to the current time information;

generating, based on the time period and a correspondence between time period and text, a text parameter value corresponding to the current time information.

17. The electronic device according to claim 12, wherein the interactive object is a time dial or a time setting display interface.

* * * * *